Jan. 12, 1965 S. J. JACOBS 3,165,752
MOTION PICTURE CAMERA USING FOCAL PLANE SHUTTERS
Filed Aug. 28, 1961 6 Sheets-Sheet 1

INVENTOR.
SIGMUND J. JACOBS
BY
ATTYS.

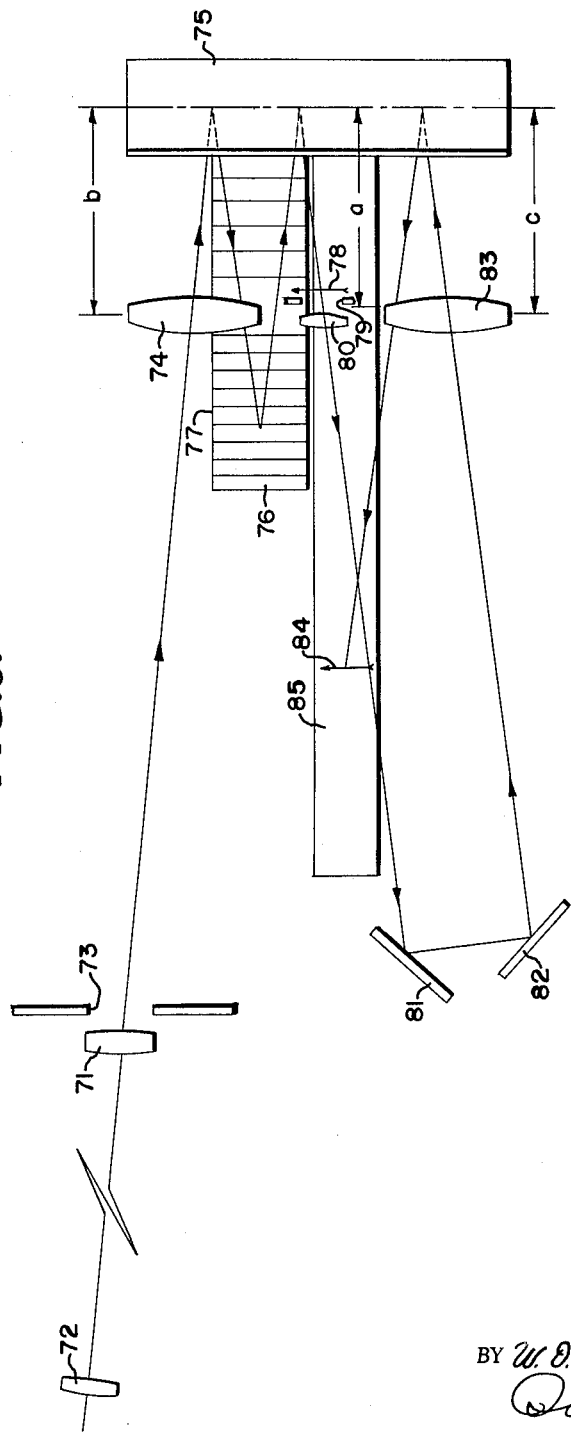

United States Patent Office 3,165,752
Patented Jan. 12, 1965

3,165,752
MOTION PICTURE CAMERA USING FOCAL PLANE SHUTTERS
Sigmund J. Jacobs, Silver Spring, Md., assignor to the United States of America as represented by the Secretary of the Navy
Filed Aug. 28, 1961, Ser. No. 134,482
10 Claims. (Cl. 352—84)
(Granted under Title 35, U.S. Code (1952), sec. 266)

The invention described herein may be manufactured and used by or for the Government of the United States of America for governmental purposes without the payment of any royalties thereon or therefor.

This invention relates to high speed framing cameras and in particular to rotating mirror framing cameras which use the focal plane shutter for exposure control. More specifically the cameras referred to are classed as using optical focal plane shutters. These cameras are used to form a plurality of equal time spaced images in which the space and time coordinate of any point in all frames may be defined with high precision.

Prior art cameras for the recording of rapid events which may have time duration of but a few microseconds have been mainly of two types. These are: (a) smears cameras in which the image within one or several narrow fixed lines in the subject frame are caused to pass the photosensitive surface at high speed by employing a rotating mirror to translate the so called slit images as continuous time smears; or (b) framing cameras in which individual frames are recorded on the film by revolving the optical beam past a multiplicity of fixed lenses each of which is located so as to see an essentially stationary image of the subject in a high speed rotating mirror. The smear camera is capable of producing very precise space and time data for the limited space field seen through narrow slits by virtue of the narrow slits that are employed. The prior art framing cameras of the type mentioned above can record frames at the rate of several million per second with good space resolution and frame size but because of an interrelation between shutter time and lens aperture they are limited in practice to time resolution in the neighborhood of ⅓ of the interframe time. In addition the frame is exposed intermittently so that the camera is incapable of obtaining directly information concerning the event during the periods when the shutter is, in effect, closed.

The cameras of this invention overcome the disadvantages of the prior art by (a) permitting the use of narrow slits for short time resolution as in a smear camera while recording full frame areas; and (b) by the use of a multiplicity of slits so that at any instant some part of the subject event will be seen by the photosensitive surface. In addition the use of multiple slits of this invention acts to increase the effective sampling rate for recording each point in the subject frame and thus overcomes a limitation on framing rate of the prior art framing cameras, the prior cameras being limited by the speed which the rotor could attain by virtue of its tensile strength and centrifugal force. The principle of the optical focal plane shutter as applied to multiple frame photography and several methods for recording a large number of images on a stationary film are set forth in our copending application, Patent Office Serial No. 116,890, now Patent No. 3,135,155, further identified as Navy Case 30,278. As described in that application the rotatnig mirror multiple slit optical focal plane shutter camera consists of the following basic parts : (a) means for forming and framing an image of the subject in a stationary frame or frames; (b) rotating mirror means for generating motion of images with the aid of image forming lenses or mirrors; (c) means for initially framing a multiplicity of images in sequential order or for generating a sequence of images; (d) multiple slit means for further multiplying the number of images formed for focal plane scanning of the images, and for increasing the framing rate of the camera; (e) rotating mirror, lens, and film means for focusing the images on the photosensitive surface and recording them on said surface.

To overcome the disadvantages of the prior art and to provide a more versatile photographic device, the present invention includes new and novel means for generating a sequence of images which are made to pass one or more fixed slits when these means are employed with a rotating mirror for producing high rates of image translation. This invention further describes new prism and mirror means for displacing the image sequences seen through each slit means so that images through each slit are recorded in separate areas on the film means. In addition the present invention includes means for independently controlling the exposure time of the group of images from each slit so that one group of images may be exposed for one time interval while others are exposed at different exposure time intervals. This invention also provides two film tracks whereby the event may be recorded on two films having different photographic characteristics.

It is an object of the present invention to provide a photographic device for successfully taking high speed photographs of a rapidly varying phenomena on a number of films and having control of the time of exposure of each separate film and the time between selected groups of photographs.

A further object is to provide a photographic device capable of recording the rapid varying phenomena on several different films at the same time.

A still further object is to provide a photographic device capable of taking high speed photographs having the ratio of exposure time to framing time made as small as desired and being limited only by the optical resolution of the camera for a given optical aperture.

Another object is to provide a photographic device wherein the modification of the ratio of exposure time to framing time does not affect the optical aperture of the camera.

Yet another object is to provide a more versatile photographic device for taking successive high speed individual photographs of rapidly varying phenomena capable of developing multi-images with known phasing from one primary image which is recorded on a multi-track framing film.

A still further object is to provide a device capable of making the maximum number of successive photographs of a rapid varying phenomena by using a multiple slit system which produces multiple images with known phasing.

Other objects and their many attendant advantages will more readily be comprehended by those skilled in the art upon a detailed consideration of the following specification taken with the accompanying drawings, wherein.

Figure 1:
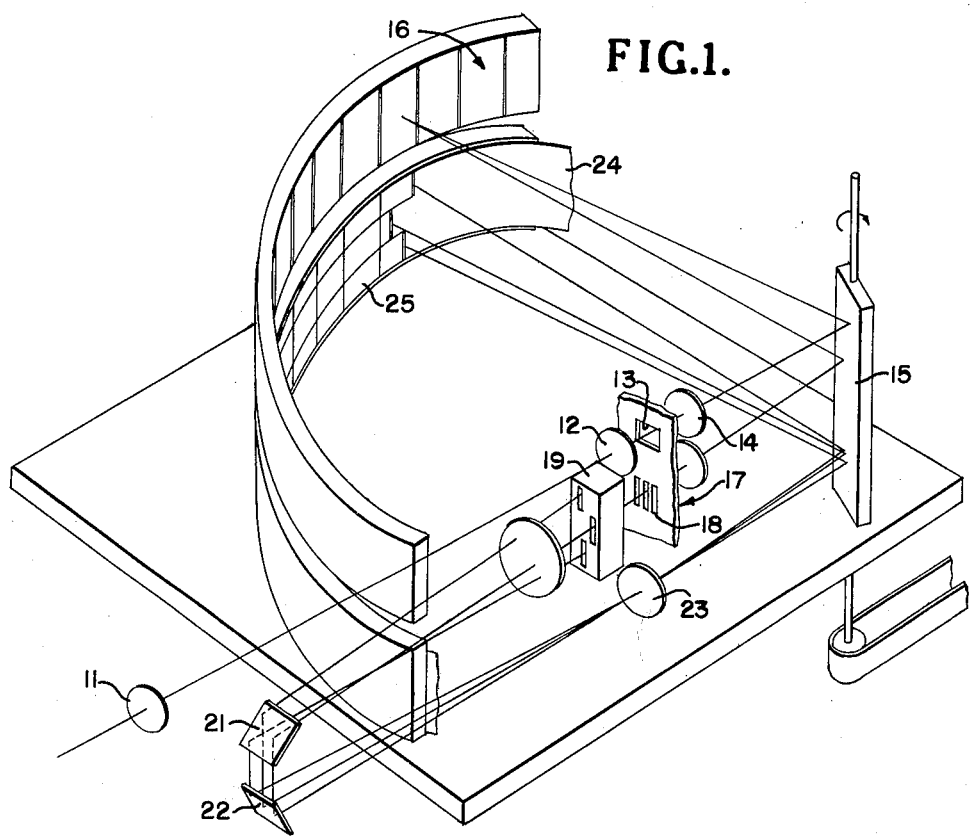
FIG. 1 is a perspective view illustrating one embodiment of the invention in which concave mirrors and a rotating mirror are employed to generate a sequence of moving images from a single subject frame.
Figure 7:
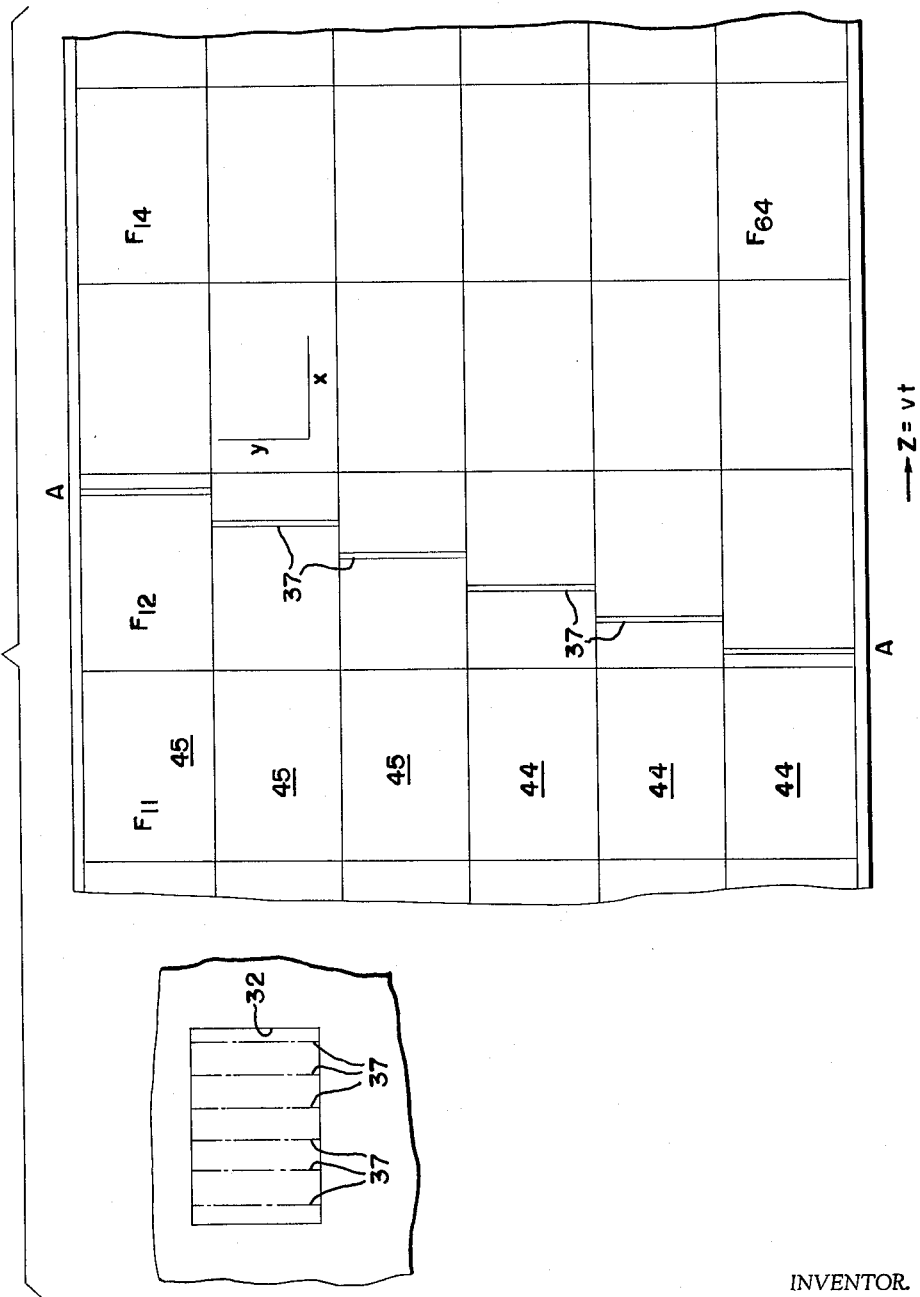

FIG. 7 is a diagrammatic view of the combined film strips at a particular instant disclosing the typical time relationship of the multiple images with respect to the subject field; and FIG. 8 is an illustration of the ray path and image formation in a rotating mirror camera in which plane mirrors and a single lens are employed instead of concave mirrors to generate the moving sequence of images which may be then recorded through one or more slits in a manner similar to that of FIG. 1.

The embodiment illustrated in FIG. 1 has incorporated a focal plane shutter with a novel optical system in a high speed framing camera. This design employs an arc containing a plurality of concave mirrors to produce a connected sequence of image frames which move past a fixed slit in the camera at a constant velocity. The moving image segments seen through the slit are relayed to a stationary film by the same rotating mirror. The optics of the camera is arranged to stop the motion of each image on the stationary film. The camera contains about 36 concave mirrors and may employ multiple slit recordings through 6 slits, although only 3 slits have been shown by way of illustration in FIG. 1. The camera will write 6 tracks of images on two 70 millimeter film strips to yield a total of about 216 frames with approximately 1 microsecond frame intervals. Each frame is approximately 1 inch by 0.75 inch. The effective aperture of the camera is about $f/22$. The arc construction of this camera allows the subject images to be recorded for approximately $\frac{1}{8}$ of the rotor cycle and recording is repeated twice per cycle when using a two-faced mirror.

Refer now to FIG. 1 wherein the essential components of the camera are illustrated utilizing three shutter slits with one film drum to record the three image sequences. Light rays follow the path as shown in FIG. 1. The subject is viewed by objective lens 11 which forms an image at the plane of the framing window 13 after the rays have passed field lens 12. Behind the framing window 13 is a second field lens 14 which with field lens 12 serves to transmit essentially all the useful rays from lens 11 to the concave mirrors in mirror bank 16 as rotating mirror 15 revolves.

Figure 2:
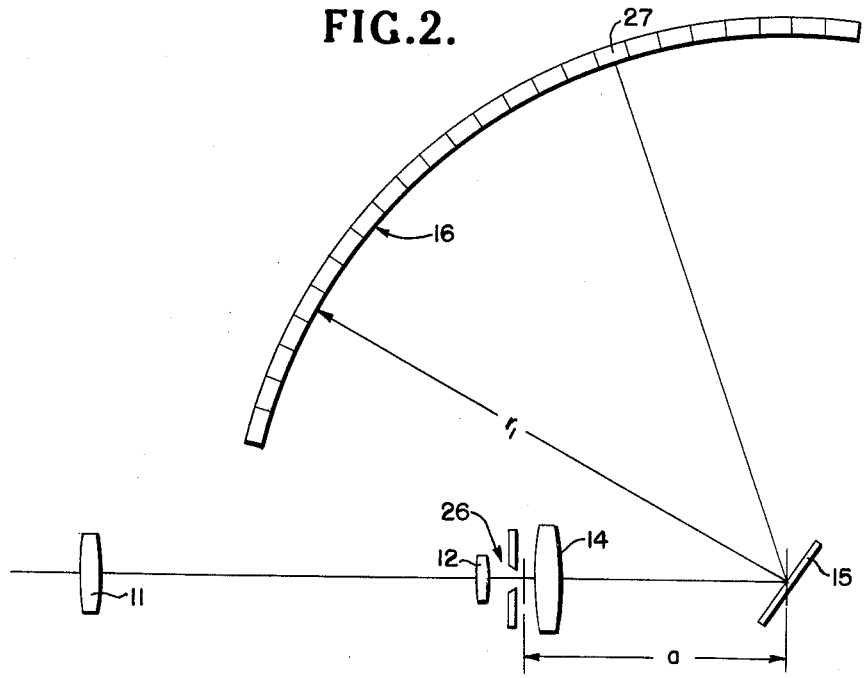
FIG. 2 is a diagrammatic view illustrating the preferred optical image path of the light beams as they strike and are reflected from the concave mirrors.
Figure 3:
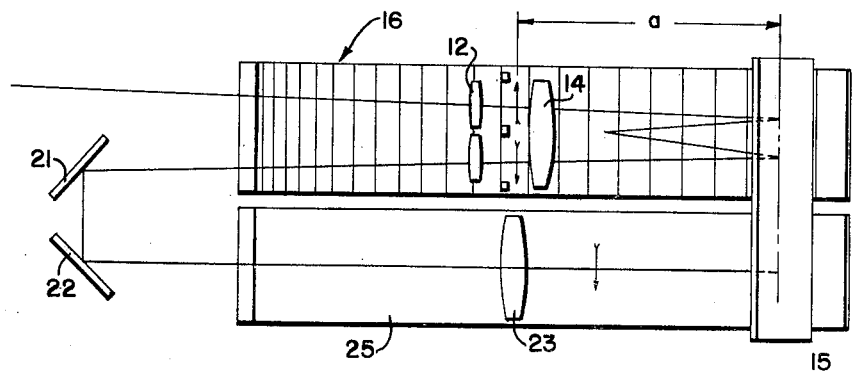
FIG. 3 is a diagrammatic view of the image path from the object to the light sensitive films.

The image rays passing through the aperture 13 are reflected by rotating mirror 15 to each of the concave mirrors 16 in sequence. The image rays are returned from the concave mirrors 16 by the rotating mirror 15 and form images in the multiple slit plane 17. The images formed by the concave mirrors at 17 move past the slits 18 as the mirror 15 rotates. A multiple prism unit 19 consisting of 45°, 90° parallelepiped prisms, generally referred to as rhomboid prisms, separates the images seen through the 3 slits so that the image segments appear to be located one above the other in subsequent ray paths. The image rays forming the three images as seen through the slits are relayed by mirror 21 and 22 to objective lens 23. The image rays continue to the rotating mirror 15 where they are reflected and focused to form 3 images upon film 25 attached to film drum 24. The instantaneous images of the optical displaced slits are shown in their relative positions on the film 25. Field lenses are placed in the optical path ahead of slit plane 18 and following rhomboid unit 19 to transmit essentially all of the useful light rays from the concave mirrors to lens 23. Refer now to FIGS. 2 and 3, which illustrate the operating principle of using concave mirrors as image sequencers. When spherical concave mirrors 16 are used as image formers the optimum point for the best image resolution is at the center of curvature of each mirror. For this reason the primary subject image and the moving reflected image are located near the same point in focal area 26, which is a distance "$a$" from the rotating mirror 15. The concave mirrors are located on the arc of the circle having a radius, $r_1$ such that $r_1 + a = r_m$, the radius of each concave mirror. On the arc of the circle having a radius $r_1$ are $n$ spherical concave mirrors with a spacing of $x_m$. The $n$th mirror is shown at 27. With a radius of curvature of each concave mirror of $r_m = r_1 + a$, these mirrors then form a reflected image at point 26 when the rotating mirror is appropriately orientated. When the rotor revolves at an angular velocity, $\omega$, a sequence of moving images appears at point 26. The angular velocity symbol, $\omega$, is considered to be the angular velocity in radians per second. The rotor speed in cycles per second is therefore $\omega/2\pi$. Each image formed by a concave mirror has a linear velocity of $4a\omega$. The distance from point 26 to mirror 15 is chosen so that $a = r_1/2$ and consequently the linear velocity becomes $2\omega r_1$. Placing the multiples slits at point 26 a continuous train of images will traverse the slits provided the width of each image, $X_F$, is the same as the concave mirror spacing, that is $X_F = X_m$. In the general case $X_F/X_m = 2a/r_1$. The images seen through the slits are subsequently reprojected as shown in the FIG. 3 to a form a stationary image sequence on the stationary film 25 of FIG. 3.

The images will be brought to rest on the film if the magnification of lens 23 of FIG. 1 or FIG. 3 is unity, if the film drum radius is $2a$, and if the number of mirror reflections suffered by the light beam between the concave mirrors and the image on the photosensitive surface is in the plane of FIG. 2 an odd number. (The two mirror reflections from mirrors 21 and 22 are effectively the same as one reflection in the plane of FIG. 2).

The restriction that the distance between the image at 13 of FIG. 1 and mirror 15 be the same as the distance between the images at 17 and mirror 15 is not a necessary limitation on the camera but rather one of convenience. It is desirable that both object and image be placed near the center of the curvature of the concave mirrors when the spherical mirrors are used since this center is the point of maximum resolution. If elliptical mirrors are used the object may be placed at one principal focus and the image at the other. It is further considered important to point out that if both object and image for the concave mirrors are located at 26 of FIG. 2 with distance "$a$" to the rotating mirror then the prime requisite for stopping the image on the film is that the film radius be $2a$ for film image equal in size to the moving image at 26. It is thus seen that $r_1$ enters into the equations for the design only in that the concave mirrors must be spaced a separation $X_m = X_F$ when $r_1 = 2a$. The camera can be constructed with $r_1$ other than $2a$ provided the angular separation $\theta_m$ of the concave mirrors is $\theta_m = x_m/r_1 = x_F/2a$. Thus mirrors of slightly different radii of curvature may be employed in the same camera as long as object and image positions are taken as the same for each mirror. There will be no variation in image size from one concave mirror to the next because of this variation in $r_m$.

Figure 4:
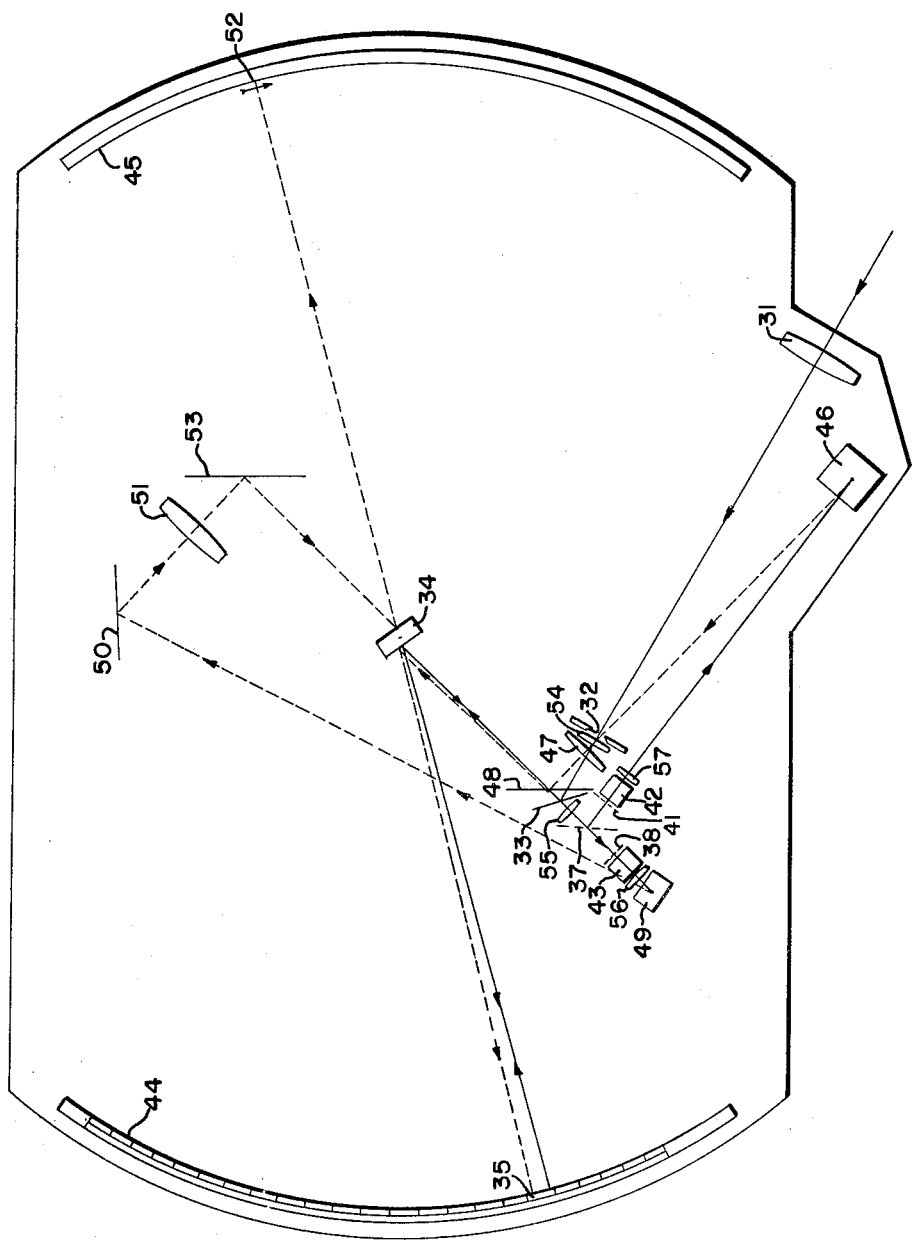
FIG. 4 is a diagrammatic view illustrating a modification of FIG. 1 utilizing multiple images with several film drums.

Refer now to FIG. 4 which illustrated an alternative arrangement of the invention wherein the optical components are located in two planes. The ray paths shown by the solid lines are in the upper sequencer deck, those shown by the dashed lines are in the lower deck. The camera components are arranged so as to form images on two film drums from a single concave mirror bank. The image of the subject to be photographed is formed by lens 31 at aperture 32. The rays are then passed by mirror 33 to the rotating mirror 34. The rays are reflected by the rotating mirror to one of the 36 equally spaced concave mirrors 36 wherein the rays are returned to the rotor and are reflected to a slotted mirror 37. The slotted mirror divides the beam into 6 equal vertical segments. Three alternate segments are transmitted to shutter slits 38 while the remaining three segments are reflected to shutter slits 41. The images via each of the segments of mirror 37 are brought to focus at the respective slit planes as they are swept across. Two similar slit systems 38, 41 are used. Each has three slits which are spaced ⅓ frame apart with respect to the adjacent slit. The two systems are set out of phase by ⅙ of a frame with respect to the alternate slit images as shown by FIG. 7. Rhomboid prisms located at points 42 and 43 displace the apparent position of the slits to form three rows of images on each of the films 44 and 45. The rays emitting from prisms 42 are dropped to the lower deck by two mirrors at 46, and then are relayed through the image forming lens 47 where they then are reflected from mirror 48 to the rotating mirror 34, and form the final images on the film 44 at a point below the corresponding concave mirror 35. The rays from the alternate prisms 43 are similarly dropped to the lower deck by mirrors 49 where they are relayed to lens 51 and form the final images at 52 on the film 45, via mirrors 50 and 53 and rotating mirror 34. Field lens 54 is used to project image rays from lens 31 into the concave mirrors 35. Field lenses 55, 56 and 57 are chosen to project the image rays from the concave mirrors to lenses 47 and 51 by way of any of the three slits in the respective paths. In this system all the images in the ray paths are of equal dimensions.

Figure 5:
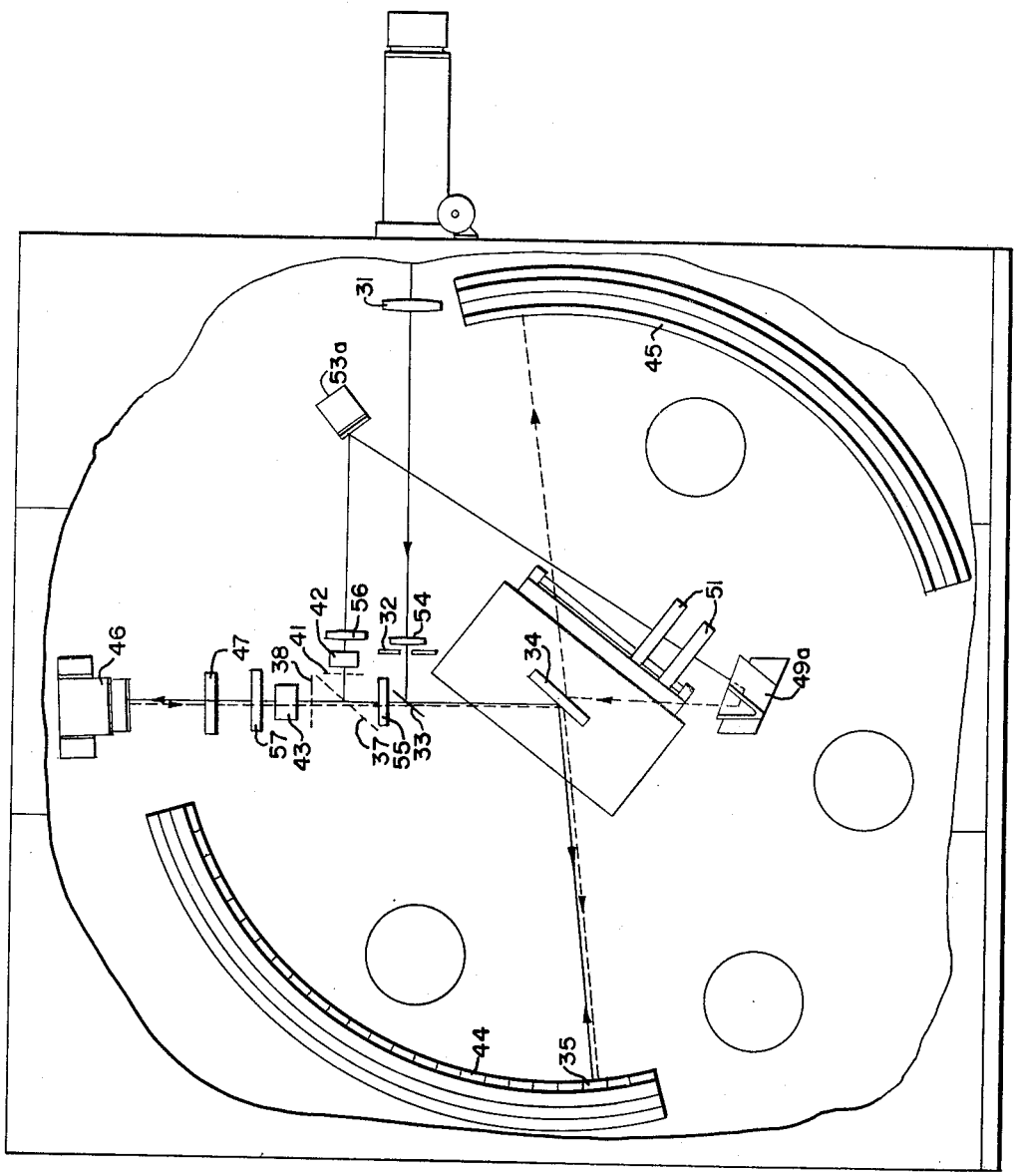
FIG. 5 is an alternate layout of a camera otherwise similar to FIG. 4.

Refer now to FIG. 5 which illustrates another embodiment of the invention utilizing the same principle of operation with the exception that the images emitted by rhomboid prisms 42 and 43 are reflected by alternate paths on plane mirrors and rotating mirror surfaces as shown. The images from prism 43 then appear on film 44 and images from 42 appear on film 45.

Uniform brightness for all points in the filmed images is obtained by making the heights of lenses 31, 47, and 51 equal to the height of concave mirror 35 and by making the width of these lenses twice the concave mirror spacing. The rotating mirror must be wide enough to subtend the rays from two concave mirrors when the angle between the normal to the rotating mirror face and the incoming light beam from lens 31 via mirror 33 is a maximum. If the order of 50% reduction in image intensity is permitted at the edges of the images the rotor may be reduced to ½ the above value.

Figure 6:
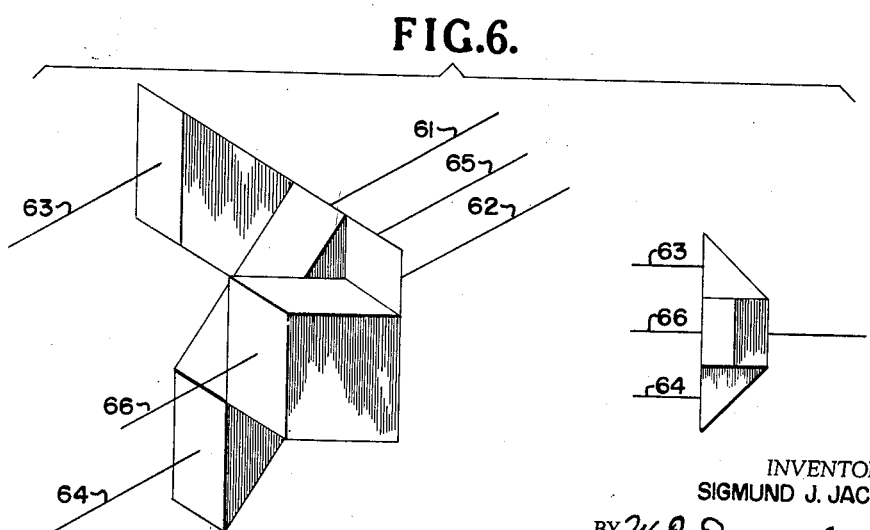
FIG. 6 is a detailed view of the parallelepiped prism units utilized in FIGS. 4 and 5 to displace images from separate slits to eventually be recorded on separate film areas.

The parallelepiped prism units 42 and 43 each consist of four prisms with parallelogram apex angles of 45° having sides at 90° to the parallelograms. This assembly is shown in FIG. 6. Two of the prisms reflect the parallel rays 61 and 65 to paths 63 and 64 which are displaced up and down approximately one frame height without lateral displacement. The remaining two prisms are combined to display ray 62 to the side and then back to 66, a continuation of 65. The sideway deflection is chosen to equalize the path length of the ray between 62 and 66 to that of rays 61 and 63 and 65 and 66. The slit units will be removable so that an operator can select any slit combination as desired. The film drums in FIGS. 4 and 5 have vacuum film holders to position each film accurately. The following table is shown by way of illustration and not in limitation thereof of the described camera. The film radius and the distance "a" given in the table are nominal. They are subject to minor corrections resulting from the requirement that the final image must be sharply focussed on the film surface even though a rotating mirror of finite thickness is used. The resulting small residual motion of images on the film has been found to have no appreciable effect on image resolution or frame distortion.

TABLE I

*Specifications of Concave Mirror Framing Camera*

| | |
|---|---|
| Number of concave mirrors | 36. |
| Number of frames generated | 216. |
| Radius of curvature, concave mirrors | 36"±0.5". |
| Distance "a" of FIGURE 2 | 12". |
| Height, concave mirrors | 3". |
| Width, concave mirrors | 15/16". |
| Spacing, concave mirrors | 1.0". |
| Radius, concave mirror circle | 24". |
| Radius, film circles | 24". |
| Film drum arcs | ~85°. |
| Film width | 70 mm. |
| Image height, each frame | 0.75". |
| Image, width, each farme | 1.0". |
| Rotating mirror width | 2.0". |
| Rotating mirror height | 6.0". |
| Rotating mirror speed | 600 r.p.s. |
| Framing rate per track at 600 r.p.s. | ~180,000/sec. |
| Framing rate 6 tracks at 600 r.p.s. | ~$1.1 \times 10^6$/sec. |
| Framing time at 600 r.p.s. (6 tracks) | ~$9.3 \times 10^{-7}$ sec. |
| Exposure time (3.6 mil slits) | ~$2 \times 10^{-8}$ sec. |
| Exposure time (72 mil slits) | ~$4 \times 10^{-7}$ sec. |
| Effective aperture | f/22. |
| Estimated resolution, line pairs per millimeter | 20. |

The camera will be housed in a unit approximately 60" x 60" x 10".

While the rotor speed is listed in Table I as being 600 revolutions per second it is considered to be well known that the bursting speed of a good rotor of the dimension given is about 10 times this value, the rotor speed is however limited more by distortion of images rather than by the strength thereof. The framing rate of $1.1 \times 10^6$/seconds is based upon the rotating mirror operating at 600 revolutions per second. By proper selection or rotor materials known to the art this rate can be increased to three or four times $10^6$ frames per second by increasing the rotor speed without producing any great loss in the image resolution quoted in Table I.

While this invention has been disclosed with the film and concave mirrors in a stationary position with a rotating mirror reflecting the image to each of the stationary parts it is considered obvious that other forms utilizing the teachings of this invention could be utilized. For example, the mirror could be placed in a stationary position and the film and concave mirrors could be rotated instead. This would give excellent results except that it would be impossible to obtain the high framing rate that is obtained by using the rotating mirror. By using the rotating drum method it would be possible to get many feet of exposed film and continuous receptivity in contrast to the several feet range therein and intermittent receptivity to the subject event.

The focal plane shutter and lens system used in combination to provide a multiple image camera, as described herein, has provided a substantial advancement in the art. The camera not only is able to record with great accuracy the x and y coordinates but also by comparing the frames of the multiple images one is able to determine with great accuracy the time component. FIG. 7 illustrates the multiple slits 37 as they view the image in relation to aperture 32 at one instant in the time cycle. FIG. 7 also shows the time coordinate of each slit 37 in relation to each portion of the film strips 44 and 45 as it sweeps across the film. The slits may be considered to be moving at constant velocity from left to right as viewed in the figure and are shown at a position corresponding to one instant of time. The image sequencer has provided many advantages with respect to the determination of the $x$ and $y$ coordinates on the film strip in relation to time. The exposure time for any point on the film is the time it takes the slit to move its own width. The framing time is the time taken for the slit to move from a given value of $x$ in one frame to the same value of $x$ in the following frame. The image intensity at a given point appears as a square step function. The maximum intensity is determined by the lens system and is independent of the slit opening. The exposure time may be varied by varying the slit width without affecting the maximum intensity. In applicant's device as disclosed herein, three slit openings which are considerably larger than the remaining three slit openings can be employed thereby allowing the use of film having different film speeds yet properly exposing each film. The exposure of the film is linear in the slit width and therefore a linear function of time for a given frame rate.

Although no two values of $x$ are exposed at the same time, the time at which a given value of $x$ is exposed can be determined from the position on the film strip with the usual calibration data. When there is little subject motion in the frame a record appears as conventional motion picture frame sequence. When considerable subject motion occurs the exact time for onset of this motion can be determined by referring to other parts of the frame which are at rest. Each frame appears very much like the frames of a conventional motion picture so that the subject identification in the record is made easy by contrast to smear camera records.

When the slit width is small the time resolution for any one point becomes comparable to that of a smear camera. By contrast to a smear camera all points within the frame are now being sampled instead of just one or a few values of one space coordinate, $x$, the time between samples corresponding to the frame interval.

Referring now to FIG. 7 wherein the position-time data can be easily extracted from the film strip as follows: a line A—A corresponding to the slit system as seen by the film represents a specific value of time $t$ for each position of its translation in the $z$ direction. Time equals 0 can be considered as the time at which the top end of A—A just enters the first image field $F_{11}$ from the left. For displacement of the slit images in the Z direction is the time given by the formula $t=z/v$ where V is the known velocity of the slit system across the film. At each value of $t$, coordinates $x$, and $y$ are read in each frame field under the line representing the slit position. Reference marks located in the subject field or at the framing window will serve to calibrate and reference each image field with respect to all others. As much data as is desired can then be read from the film record for further use.

It is considered obvious from the foregoing disclosure that this novel device provides a camera that is capable of detecting any fast occurring phenomena such as detonation and shock waves. By utilizing a framing camera technique anyone having ordinary skill in the art is capable of determining the results of the experiment by merely referring to the recorded film. This type of framing camera provides a means whereby people who have somewhat limited experience with cameras can readily obtain high precision data from the $x$ and $y$ coordinates with respect to time, which heretofore required much more complicated equipment and an expert in interpreting the data.

The method of generating an image sequence shown in FIGS. 1, 2, 3, 4 and 7 is capable of being extended so that a rotating mirror framing camera based on this principle of sequencing can be made to have continuous receptivity to the subject event by employing a greater arc or a plurality of arcs for the concave mirror bank and two or more reflecting faces on the rotating mirror. For example, if a 4 faced rotating mirror is employed and the concave mirror arc is increased to 180° the image sequencer can be made to recycle its image sequence repeatedly. Other combinations of rotating mirror faces and concave mirror arc can also be employed in accordance with related devices as for example, smear cameras, already known to the art.

An alternate form of this invention for generating a sequence of images in conjunction with a rotating mirror is illustrated in the camera layout of FIG. 8. Referring to FIG. 8; an image of the subject is formed by an objective lens 72 in framing window 73. A field lens 71 serves to transmit the useful rays from the objective lens to a second objective or relay lens 74. The objective lens 74 transmits the image rays to rotating mirror 75 which then reflects the image rays to a plane mirror bank 76. The image rays are reflected by one of the plane mirrors 77 of mirror bank 76 so as to return the image rays to rotating mirror 75. The image rays are reflected the second time by rotating mirror 75 to sweep the images past slit 79 located in plane 78. One or more slits 79 transmit rays from image segments to field lens 80. If more than one slit is used a parallelepiped unit as previously described would be placed behind the slit system. Field lens 80 is used to transmit the image forming rays from relay lens 74 to relay lens 83 by way of mirrors 71 and 82. Relay lens 83 views the image sequence seen through slits 79 and projects them by way of a reflection on rotating mirror 75 to form final images on photosensitive material 84 located on film drum 85.

The images formed with the aid of consecutive plane mirrors 76 on film 84 will be stationary relative to the film when rotating mirror 75 is revolving if the following conditions for compensation of the image motion are met. To set forth these conditions it is necessary to define a number of lengths which are significant to the proper functioning of the camera. The distance from slits 79 to the rotating mirror 75 is defined as "$a$"; the distance from each plane mirror of 77 to the rotating mirror 75 is defined as "$r_1$"; the distance from relay lens 74 to the rotating mirror 75 is defined as "$b$"; the distance from relay lens 83 to the rotating mirror 75 is defined as "$c$"; and the distance from the film drum 85 to the rotating mirror 75 is defined as "$r_2$." By way of example the mathematics defining the speeds of images at slits 79, and the relation between plane mirror spacing, "$w_m$" and image width, "$w_i$" will only be given for the case in which images are all made equal in size by using well known optical principles.

When the angular velocity of the rotating mirror is $\omega$ radians per unit time the velocity of images at slit 79 will be $V=4\omega(r_1+a)$. The projection of the image sequents to film drum 85 by lens 83 will result in stationary images on film 84 for this special case if $r_2=2(r_1+a)$ and if mirrors 81 and 82 are employed as in FIG. 8. An additional even number of reflections in a plane normal to the rotating axis of rotating mirror 75 will also result in stationary images on a film drum located a distance as specified above from the rotating mirror 75. A continuous sequence of images will pass the slits 79 and be recorded on film 84 if the relation between image width, $w_i$, and plane mirror spacing, $w_m$, at $r_1$ given as $$w_i/w_m=2(r_1+a)/r_1$$

is maintained. It is seen that the parameters "$b$" and "$c$" do not enter into the problem except that they become important in defining the focal lengths of lenses 74 and 83 by methods well known to persons skilled in the art.

In considering the function of the parallelepiped prism unit described in FIG. 6 it is clear that its function can equally well be accomplished by the use of plane mirrors so long as image paths are equalized. The invention also anticipated the use of additional reflecting surfaces whereby more than six rows of images can be formed in a predetermined time relation. In addition the function of the parallelepiped unit can be achieved by the use of light transmitting fibers arranged so as to transmit image segments coherently from the individual slits to a displaced position in such manner that the moving image segments seen at the exit end of the coherent fiber bundle may have the image motion compensated by equivalent film motion either by direct mechanical displacement of the film or by appropriate optical projection with a lens and a rotating mirror.

While the invention has been described using a single rotating mirror for both sequencing and compensation there may be occasions when these two functions can equally well be performed by separate rotating elements not necessarily moving at the same angular velocity so long as the apparent film velocity and direction imparted by the second recording system appears to be the same at the slit plane as the velocity of the images passing the slit plane.

Obviously many modifications and variations of the present invention are possible in the light of the above teachings. It is therefore to be understood, that within the scope of the appended claims, the invention may be practiced otherwise than as specifically described.

What is claimed as new and desired to be secured by Letters Patent of the United States is:

1. A camera for forming a series of photographs on a light sensitive film of an object moving at high speed comprising a rotating reflecting means for reflecting image rays received from the object to provide continuous sweeping image rays along a first path, means for receiving and diverting said sweeping image rays along a second path in a timed relationship back to said first named means, an opaque baffle plate having a plurality of apertures therein arranged in such a manner that a multiplication of images is formed after passage of the rays through the apertures, said first named means reflecting the sweeping image rays in the second path across said baffle plate, the apertures in said baffle plate receiving and passing the multiple of image rays in a timed relationship through said baffle plate, channeling means for placing said multiple image rays in a displaced spacial relationship, recording means having an arcuate shape for receiving and recording the multiple image rays from said first named means, a plurality of mirrors for receiving and reflecting said muutiple of image rays from said channeling means to said first named means whereby the multiple images are reflected by the first named means to said recording means for recordation in a frame relation.

2. The camera of claim 1 wherein said means for reflecting image rays from an object is a rotating mirror.

3. The camera of claim 2 wherein said means for recording said images in a framed relation includes a first film strip located on one side of the camera and a second film strip located on the opposite side of said camera wherein one half of said images are reflected by one side of said rotating mirror to said first film strip and the second half of said plurality of images is reflected by the other side of said rotating mirror to said second film strip.

4. The camera of claim 1 wherein the means for receiving and diverting said sweeping image rays along a second path comprises a plurality of mirrors.

5. The camera of claim 4 wherein said plurality of mirrors are located in an arc and consists of a plurality of concave mirrors for receiving and reforming an image respectively.

6. The camera of claim 1 wherein said apertures are located in a row having the same height and located in the same plane.

7. The camera of claim 1 wherein said channeling means for placing said multiple image rays in a series relation is a parallelepiped prism unit.

8. A camera for forming a series of photographs of a fast moving object on a light sensitive film over a very short time interval comprising a housing, an objective lens mounted on said housing for viewing the fast moving object, a first baffle plate located in said camera, said baffle plate having an aperture located therein, said lens focusing the object rays to the aperture, the aperture limiting the object field by limiting the object rays passing therethrough, a rotatable mirror for reflecting the object rays passing through the aperture, a bank of mirrors located in an arc to receive the light rays reflected from said rotatable mirror in successive order, said bank of mirrors reflecting and refocusing the object light rays back to said rotatable mirror, a second opaque baffle plate located in said camera and having a plurality of parallel slits therein, each slit of the plurality of slits being spaced in such a manner so as to be individually exposed in successive order to the refocused object rays as they are reflected by the rotatable mirror from the bank of mirrors such that a multiplication of images is formed after passage through the plurality of slits, a prism device located adjacent to the plurality of slits for receiving the object light rays passing therethrough, said prism device rechanneling the multiple object rays in a timed spaced relationship, a photographic film, means for supporting said photographic film in an arcuate path in said housing, lens means for refocusing said multiple object rays and reflecting means including said rotatable mirror for exposing said film to the rechanneled refocused multiple object rays in a time spaced relationship.

9. Photographic apparatus for providing a series of image exposures over a short time interval of fast occurrences, comprising a frame, lens means mounted on said frame for viewing an image, rotatable reflecting means mounted in said apparatus for continuously reflecting image rays from the image, a baffle plate located between said lens means and said rotatable reflecting means, an aptreure located in said baffle plate for limiting the image rays passing to said rotatable means, a stationary reflecting means located in an arcuate relationship with respect to said rotatable reflecting means for providing a sequence of images to said rotatable reflecting means, said stationary reflecting means receiving the image rays from said rotatable reflecting means and providing a successive series of reflected and refocused images thereto, a baffle plate having a plurality of slits located at the focal point of said stationary reflecting means, said slits being exposed to the sequence of images as they are reflected from said rotatable reflecting means in such a manner that a multiplication of images is formed after passage through the plurality of slits, prism means for receiving and channeling the multiple images passed by the plurality of slits, a light sensitive film, holding means located around said rotatable reflecting means for holding said film in an arcuate configuration, transmitting means for passing the multiple images channeled by said prism means to said rotatable reflecting means, said rotatable reflecting means reflecting said channeled multiple images onto said film in a time spaced relationship.

10. Photographic apparatus for providing a series of image exposures over a short interval of time of fast occurrences, comprising a frame, lens means mounted on said frame for viewing an image, a first baffle plate having an aperture therein for limiting the image rays to said lens means, said lens means focusing the image rays to a focal plane at a predetermined distance such that a multiplication of images is formed after passage through said plurality of apertures, rotatable reflecting means for receiving and reflecting the image rays from said lens means, a plurality of mirrors located in an arcuate bank for receiving and reflecting in sequence the image rays from said rotatable means, a second opaque baffle plate having a plurality of apertures therein located at the focal plane of said lens means, the image rays from said plurality of mirrors being reflected and swept across the apertures in a timed relation by said rotatable means, channeling means located adjacent said opaque baffle plate for receiving the plurality of images emitted by the apertures and rechanneling said images in a spaced relationship, a light sensitive film, holding means located around said rotatable means for holding the film in an arcuate configuration, transmitting means for passing and refocusing the multiple images to said film in a spaced relationship.

References Cited by the Examiner

UNITED STATES PATENTS

| 2,668,473 | 2/54 | Brixner | 88—16 |
| 2,687,062 | 8/54 | Baird | 88—16.8 |
| 2,822,721 | 2/58 | Parker et al. | 88—16 |
| 3,012,470 | 12/61 | Bohn et al. | 88—16.6 |

LEYLAND M. MARTIN, *Primary Examiner.*

EMIL G. ANDERSON, *Examiner.*